(12) United States Patent
Enomoto et al.

(10) Patent No.: US 8,973,933 B2
(45) Date of Patent: Mar. 10, 2015

(54) SUSPENSION DEVICE

(75) Inventors: Mitsuru Enomoto, Saitama (JP); Mamoru Akeda, Tokyo (JP); Nobuhiro Shibuya, Chiba (JP)

(73) Assignees: Hino Motors, Ltd., Tokyo (JP); NHK Spring Co., Ltd., Yokohama-shi (JP); Horikiri, Inc., Yachiyo-shi (JP)

( * ) Notice: Subject to any disclaimer, the term of this patent is extended or adjusted under 35 U.S.C. 154(b) by 0 days.

(21) Appl. No.: 13/816,746

(22) PCT Filed: Aug. 26, 2011

(86) PCT No.: PCT/JP2011/004753
§ 371 (c)(1),
(2), (4) Date: Feb. 13, 2013

(87) PCT Pub. No.: WO2012/029266
PCT Pub. Date: Mar. 8, 2012

(65) Prior Publication Data
US 2013/0140786 A1 Jun. 6, 2013

(30) Foreign Application Priority Data

Aug. 31, 2010 (JP) ................................. 2010-193544

(51) Int. Cl.
*B60G 11/12* (2006.01)
*B60G 11/04* (2006.01)

(52) U.S. Cl.
CPC ................ *B60G 11/12* (2013.01); *B60G 11/04* (2013.01); *B60G 2202/112* (2013.01); *B60G 2204/121* (2013.01); *B60G 2204/45* (2013.01)
USPC .............. 280/124.175; 280/124.17; 267/36.1; 267/260; 267/269; 267/279; 267/271

(58) Field of Classification Search
USPC ......... 280/124.17, 124.175; 267/36.1, 44, 45, 267/51, 260, 265, 269–271
See application file for complete search history.

(56) References Cited

U.S. PATENT DOCUMENTS 2,843,395 A * 7/1958 Brumbaugh ................... 280/680
2,973,951 A * 3/1961 Billing ............................ 267/30
(Continued)

FOREIGN PATENT DOCUMENTS

JP      57-28007 U     2/1982
JP      61-44884 Y2    12/1986
(Continued)

OTHER PUBLICATIONS

U.S. Appl. No. 13/813,797, filed Feb. 1, 2013, Enomoto, et al.
(Continued)

*Primary Examiner* — Ruth Ilan
*Assistant Examiner* — Darlene P Condra
(74) *Attorney, Agent, or Firm* — Oblon, McClelland, Maier & Neustadt, L.L.P.

(57) ABSTRACT

A suspension device for suspension of an axle by an intermediate portion of a single leaf spring has first restriction device which restricts, upon breakage of the leaf spring at a position behind the intermediate portion of the spring, the rear portion of the leaf spring from tilting downwardly relative to a shackle, and a second restriction device for restriction of the shackle from pivotally moving backward beyond a predetermined angle. The first restriction device is constituted by a stopper plate on the shackle for support of the rear portion of the leaf spring from below upon breakage.

4 Claims, 5 Drawing Sheets

(56) References Cited

U.S. PATENT DOCUMENTS

| | | | |
|---|---|---|---|
| 3,841,655 A * | 10/1974 | Schaeff | 280/124.116 |
| 4,872,653 A * | 10/1989 | Chuchua | 267/271 |
| 6,062,549 A * | 5/2000 | Lamberti | 267/48 |
| 6,601,836 B1 * | 8/2003 | Dankow et al. | 267/271 |
| 6,951,343 B2 * | 10/2005 | Hildebrand | 280/124.175 |
| 2007/0090623 A1 * | 4/2007 | Preijert et al. | 280/124.175 |
| 2008/0128968 A1 * | 6/2008 | Platner et al. | 267/260 |
| 2010/0127444 A1 * | 5/2010 | Glass | 267/264 |

FOREIGN PATENT DOCUMENTS

| | | |
|---|---|---|
| JP | 6 173986 | 6/1994 |
| JP | 2010 241382 | 10/2010 |

OTHER PUBLICATIONS

International Search Report issued Dec. 6, 2011 in PCT/JP2011/004753.

International Search Report Issued Dec. 6, 2011 in PCT/JP11/04753 Filed Aug. 26, 2011.

* cited by examiner

SUSPENSION DEVICE

TECHNICAL FIELD

The present invention relates to a suspension device.

BACKGROUND ART

Conventionally, among various types of suspension devices for suspension of an axle from a frame, a suspension device with a plurality of layered leaf springs, which is simple in structure, less expensive and highly strong and durable, has been extensively used for a truck or other vehicle.

In such suspension device, it is a matter of course to mount the plural layered leaf springs so as to enable positioning of the axle even if any of the springs breaks, which however disadvantageously results in increases in weight of the vehicle. Thus, a suspension device has been studied which comprises a single leaf spring for weight saving.

There exists, for example, the following Patent Literature 1 as prior art document relating to this kind of leaf suspension.

CITATION LIST

Patent Literature

[Patent Literature 1] JP 6-173986A

SUMMARY OF INVENTION

Technical Problems

In the case of a single leaf spring used and if the spring breaks at a position behind an axle-suspending intermediate portion of the spring, a rear portion of the spring behind the break position of the spring may tilt downward into contact with a ground and thus a vehicle body may lift up in pole-vault manner with the rear portion of the spring as support into movement of wheels away from the ground. It is feared that, for example in the case of front wheels being moved away, loss of steering and/or braking may be caused; in the case of rear wheels being moved away, loss of braking and/or non-transmittal of a driving force to the ground may be caused.

The invention was made in view of the above and has its object to prevent a rear portion of a leaf spring from tilting downward into contact with a ground even if the spring breaks at a position behind an intermediate portion of the spring.

Solution to Problems

The invention is directed to a suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, characterized in that it comprises first restriction means for restricting a rear portion of said leaf spring from tilting downward relative to said shackle upon breakage of said leaf spring at a position behind the intermediate portion of the spring and second restriction means for restricting said shackle from pivotally moving backward beyond a predetermined angle, said first restriction means comprising a stopper on said shackle for supporting the rear portion of said leaf spring from below upon the breakage.

Thus, in this way, upon the breakage of the leaf spring at the position behind the intermediate portion of the spring, the shackle is restricted by the second restriction means from pivotally moving backward beyond the predetermined angle while the rear portion of the leaf spring is supported from below by the stopper as the first restriction means to restrict the leaf spring from pivotally moving downward beyond a predetermined angle, so that there is no fear that the broken rear portion of the leaf spring contacts the ground.

The invention is also directed to a suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, characterized in that it comprises first restriction means for restricting a rear portion of said leaf spring from tilting downward relative to said shackle upon breakage of said leaf spring at a position behind the intermediate portion of the spring and second restriction means for restricting said shackle from pivotally moving backward beyond a predetermined angle, said first restriction means comprising a bush arranged at a connection between said shackle and the rear end of said leaf spring to allow rotation of the rear end of said leaf spring using shearing strain of rubber, said bush being assembled with a reactive force being preliminarily afforded for upward tipping-up of the rear portion of said leaf spring upon the breakage.

Thus, in this way, upon the breakage of the leaf spring at the position behind the intermediate portion of the spring, the shackle is restricted by the second restriction means from pivotally moving backward beyond the predetermined angle while the rear portion of the leaf spring is lifted up by means of tipping-up force of the bush as the first restriction means to restrict the leaf spring from pivotally moving downward beyond the predetermined angle, so that there is no fear that broken rear portion of the leaf spring contacts the ground.

The invention is also directed to a suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, characterized in that it comprises first restriction means for restricting a rear portion of said leaf spring from tilting downward relative to said shackle upon breakage of said leaf spring at a position behind the intermediate portion of the spring and second restriction means for restricting said shackle from pivotally moving backward beyond a predetermined angle, said first restriction means comprising a stopper for supporting the rear portion of said leaf spring from below upon the breakage, said stopper being provided on a tie rod which in turn is arranged just behind said axle.

Thus, in this way, upon the breakage of the leaf spring at the position behind the intermediate portion of the spring, the shackle is restricted by the second restriction means from pivotally moving backward beyond the predetermined angle while the rear portion of the leaf spring is supported from below by the stopper as the first restriction means to restrict the leaf spring from pivotally moving downward beyond the predetermined angle, so that there is no fear that broken rear portion of the leaf spring contacts the ground.

Advantageous Effects of Invention

According to the suspension device of the invention mentioned in the above, excellent effects and advantages can be obtained. Even if a leaf spring breaks at a position behind an intermediate portion of the spring, the spring can be restricted from pivotally moving downward over a predetermined angle and a rear portion of the spring can be preliminarily prevented from tilting downward into contact with a ground. Thus, lift of a vehicle body in pole-vault manner using a rear portion of the spring as support can be reliably averted to substantially improve the safety.

DESCRIPTION OF EMBODIMENTS

Embodiments of the invention will be described in conjunction with the drawings.

Figure 1:
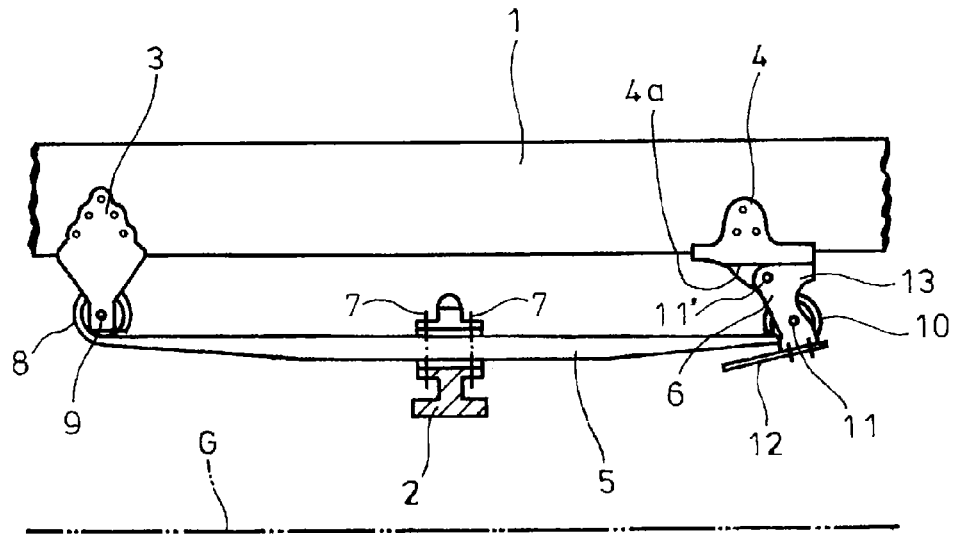
FIG. 1 is a side view showing a first embodiment of a suspension device according to the invention.

FIGS. 1-4 show a first embodiment of a suspension device according to the invention. As shown in FIG. 1, in this embodiment, front and rear brackets 3 and 4 are arranged on a side rail 1 ahead of and behind an axle 2, respectively. A single leaf spring 5 is pivoted at a front end thereof to the front bracket 3 and is pivoted at a rear end thereof to the rear bracket 4 through a shackle 6 which in turn is pivotally movable backward and forward. The axle 2 is suspended by an intermediate portion of the leaf spring 5.

More specifically, the axle 2 is connected to a lower surface of the intermediate portion of the leaf spring 5 through U-shape bolts 7. The front end of the leaf spring 5 is wound upwardly into an eye 8 which is rotatably wound around a horizontal pin 9 of the front bracket 3 on the side rail 1. Just like the front end of the leaf spring 5, the rear end of the spring is wound upwardly into an eye 10 which is rotatably wound around a horizontal pin 11 of a lower portion of the shackle 6 which in turn is pivotally movable backward and forward about a horizontal pin 11' of the rear bracket 4 on the side rail 1.

In this embodiment, as the first restriction means for restricting the rear portion of the leaf spring 5 from tilting downward relative to the shackle 6 upon breakage of the leaf spring 5 at a position behind the intermediate portion of the spring, a length of forwardly protruding stopper plate 12 (stopper) is mounted on a bottom of the shackle 6, so that the rear portion of the leaf spring 5 is supported from below by the stopper plate 12 upon the breakage.

As the second restriction means for restricting the shackle 6 from pivotally moving backward beyond a predetermined angle, a length of retainer pawl 13 protrudes backward from an upper end of the shackle 6. Thus, even if upon the breakage the shackle 6 tries to pivotally move backward due to a load of the rear portion of the leaf spring 5 applied to the stopper plate 12, the engagement of the retainer pawl 13 with the step 4a of the rear bracket 4 restricts the shackle 6 from pivotally moving backward beyond the predetermined angle.

Here, FIG. 1 is an illustration where a truck or other objective vehicle is in gross vehicle weight condition. In such condition, the engagement of the retainer pawl 13 of the shackle 6 with the step 4a of the rear bracket 4 restricts the backward pivotal movement while the stopper plate 12 is kept away from the lower surface of the leaf spring 5 with a gap, such gap remaining a little even in an empty vehicle weight condition.

Specifically, the rear end of the leaf spring 5 extends most backward when the spring is flattened in the gross vehicle weight condition. Therefore, when the engagement of the retainer pawl 13 of the shackle 6 with the step 4a on the rear bracket 4 restricts the backward pivotal movement in the gross vehicle weight condition, functions of the shackle 6 are not hurt. Moreover, when the gap between the stopper plate 12 and the lower surface of the leaf spring 5 remains a little even in the empty vehicle weight condition, the stopper plate 12 can be caused not to abut on the lower surface of the leaf spring 5 within a suspension stroke.

In this regard, it is necessary to set the tilting angle of the rear portion of the leaf spring 5 restricted by the stopper plate 12 within an angle range where the rear portion of the leaf spring 5 can be surely prevented from contacting with the ground G even if the leaf spring 5 breaks at a position just behind the axle 2 and thus the rear portion of the spring has a maximum length.

Figure 2:
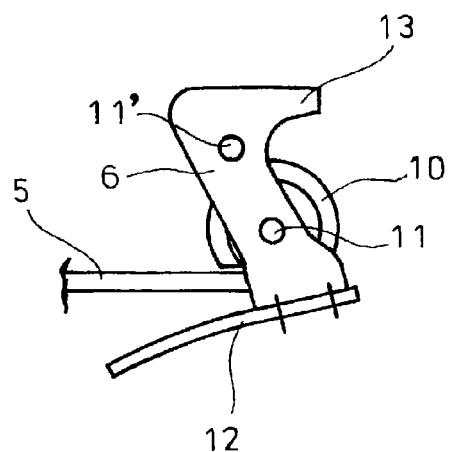
FIG. 2 is a side view showing a modification of the stopper plate in FIG. 1.
Figure 3:
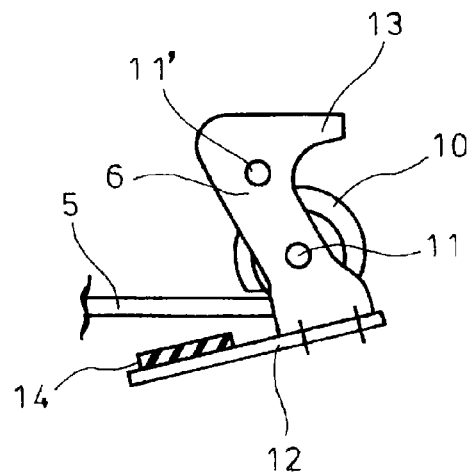
FIG. 3 is a side view showing a further modification of the stopper plate in FIG. 1.

As shown in FIG. 2, the stopper plate 12 may be formed with downward curving to make the curving portion linearly contact with the lower surface of the leaf spring 5; alternatively, as shown in FIG. 3, a rubber 14 may be fitted on an upper surface of the stopper plate 12 to prevent a tip edge of the stopper plate 12 from contacting with the lower surface of the leaf spring 5. Then, noise is relieved which may be produced in contact of the stopper plate 12 with the leaf spring 5.

Though the stopper plate 12 is mounted as a separate part on the bottom of the shackle 6 in the embodiment illustrated, the stopper plate 12 may be, of course, integrally formed on the bottom surface of the shackle 6.

Figure 4:
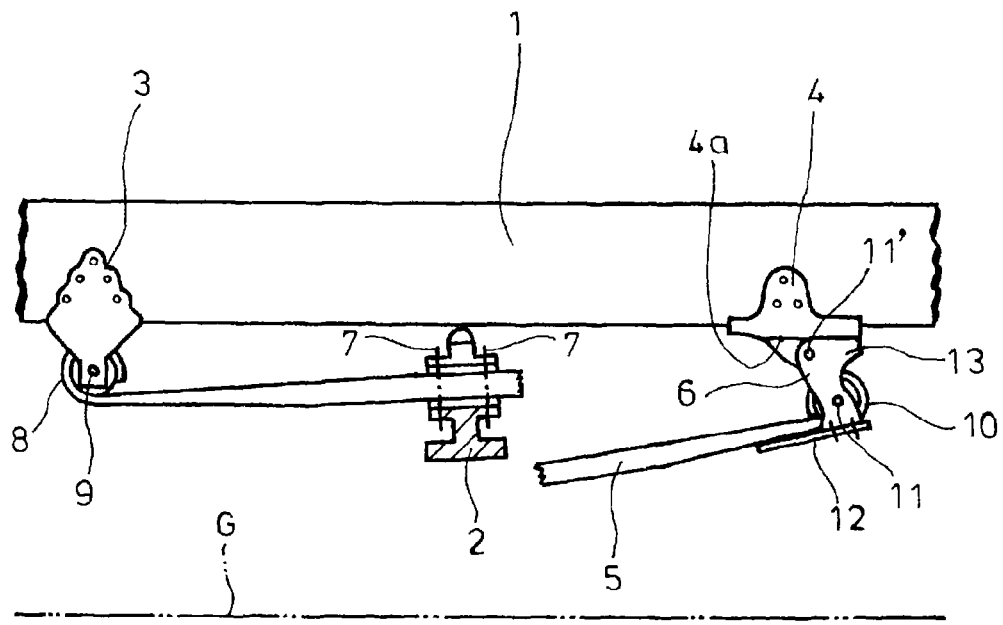
FIG. 4 is a side view showing a leaf spring in FIG. 1 upon breakage.

Thus, with the suspension device thus constituted, upon the breakage of the leaf spring 5 at the position behind the intermediate portion of the spring as shown in FIG. 4, the engagement of the retainer pawl 13 with the step 4a of the rear bracket 4 restricts the shackle 6 from pivotally moving backward beyond the predetermined angle while the rear portion of the leaf spring 5 is supported from below by the stopper plate 12 to restrict the leaf spring 5 from pivotally moving downward beyond the predetermined angle, so that there is no fear that the broken rear portion of the leaf spring 5 contacts the ground G.

Thus, according to the above embodiment, even if the leaf spring 5 breaks at a position behind the intermediate portion, the leaf spring 5 can be restricted from pivotally moving downward beyond the predetermined angle and the rear portion of the leaf spring 5 can be prevented from tilting downward into contact with the ground G, so that the lift of the vehicle body in pole-vault manner using the rear portion of the leaf spring 5 as support can be surely averted to substantially improve the safety.

Figure 5:
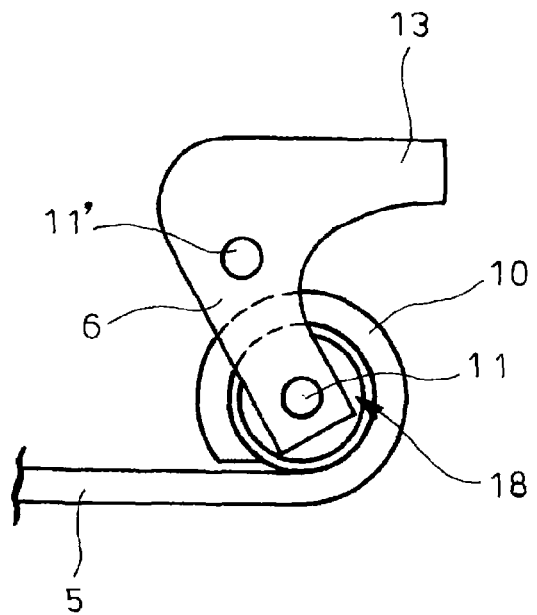
FIG. 5 is a side view showing a second embodiment of the suspension device according to the invention.
Figure 6:
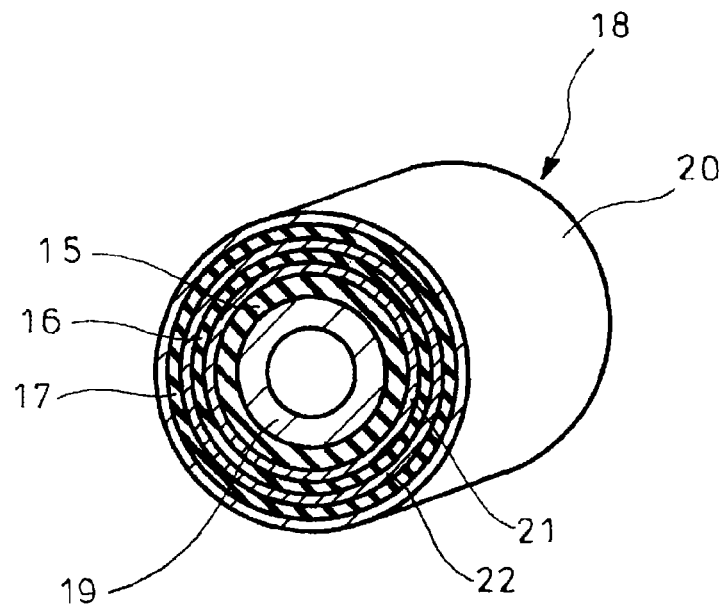
FIG. 6 is a perspective view showing particulars of a bush in FIG. 5.
Figure 7:
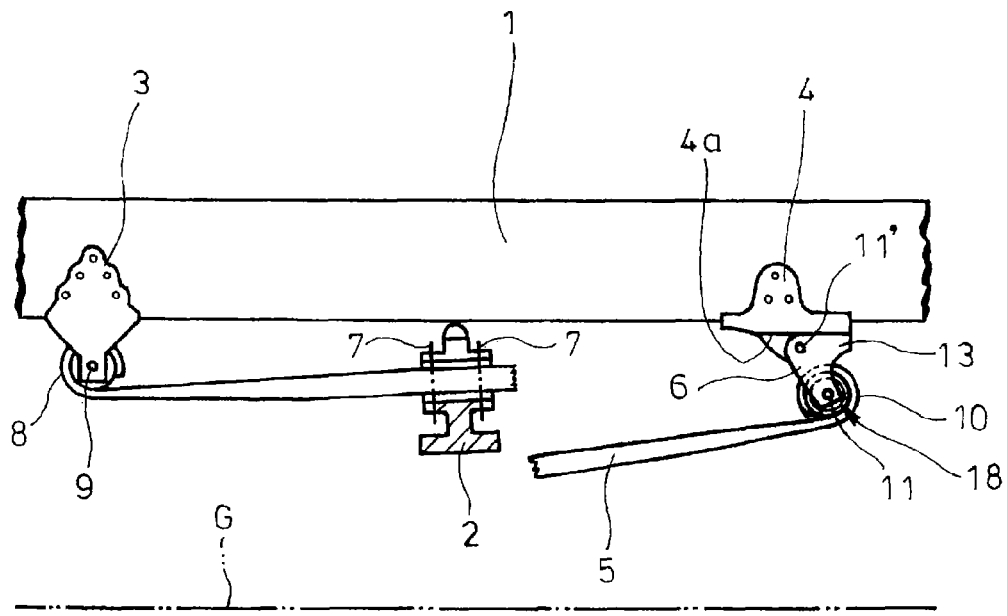
FIG. 7 is a side view showing the leaf spring in FIG. 5 upon breakage.

FIGS. 5-7 shows a second embodiment of a suspension device according to the invention. As shown in FIG. 5, in this embodiment, in place of the stopper plate 12 as the first restriction means in the previous first embodiment, the first restriction means comprises a bush 18 arranged at a connection between the shackle 6 and the rear end of the leaf spring 5 to allow rotation of the rear end of the leaf spring 5 using shearing strain of rubbers 15, 16 and 17. The bush is assembled with a reactive force being preliminarily afforded for upward tipping-up of the rear portion of the leaf spring 5 upon the breakage.

Specifically, when the eye 10 on the rear end of the leaf spring 5 is wound about the horizontal pin 11 of the lower portion of the shackle 6, a bush 18 is interposed between the horizontal pin 11 and the eye 10. In this embodiment, the bush 18 is unrotatively and integrally fitted between the eye 10 on the rear end of the leaf spring 5 and the horizontal pin 11 and allows rotation of the rear end of the leaf spring 5 using shearing strain of the rubbers 15, 16 and 17.

In this case, in order to fulfill common desires such that rigidity of the bush 18 perpendicular to an axis thereof is enhanced to improve drivability, rotational rigidity is reduced to improve ride quality and rotational strain of the rubbers 15, 16 and 17 is minimized to improve durability, as shown in enlarged scale in FIG. 6, the cylindrical rubbers 15, 16 and 17 interposed between the inner and outer cylinders 19 and 20 of the bush 18 is made into a radially layered coaxial multiple structure with inter rings 21 and 22 intervened.

In assembling of the multiple structure, the bush 18 of FIG. 6 is preliminarily assembled to the eye 10 of the leaf spring 5; upon assembling of this to a vehicle, the leaf spring 5 is bended or arched upward by applying upward and downward loads. In such condition, the inner cylinder of the bush 18 is integrally pivoted to the lower portion of the shackle 6 through the horizontal pip 11 and a bolt and a nut, and then the upward and downward loads are released to return the leaf spring 5 from bent condition to a normal use condition. In this way, a reactive force for upward tipping-up of the rear portion of the leaf spring 5 upon the breakage is preliminarily afforded.

With the suspension device this constituted, as shown in FIG. 7, upon the breakage of the leaf spring 5 at a position behind the intermediate portion of the spring, the engagement of the retainer pawl 13 with the step 4a of the rear bracket 4 restricts the shackle 6 from pivotally moving backward beyond the predetermined angle while the rear portion of the leaf spring 5 is lifted up by tipping-up force of the bush 18 to restrict the leaf spring 5 from pivotally moving downward beyond the predetermined angle, so that there is no fear that the broken rear portion of the leaf spring 5 contacts the ground G.

Thus, also in the second embodiment, upon the breakage of the leaf spring 5 at the position behind the intermediate portion of the spring, the leaf spring 5 can be restricted from pivotally moving downward beyond the predetermined angle to beforehand prevent the rear portion of the leaf spring 5 from tilting downward into contact with the ground G, so that lift-up of the vehicle body in pole-vault manner with the rear portion of the leaf spring 5 as support can be surely averted to substantially improve the safety.

Figure 8:
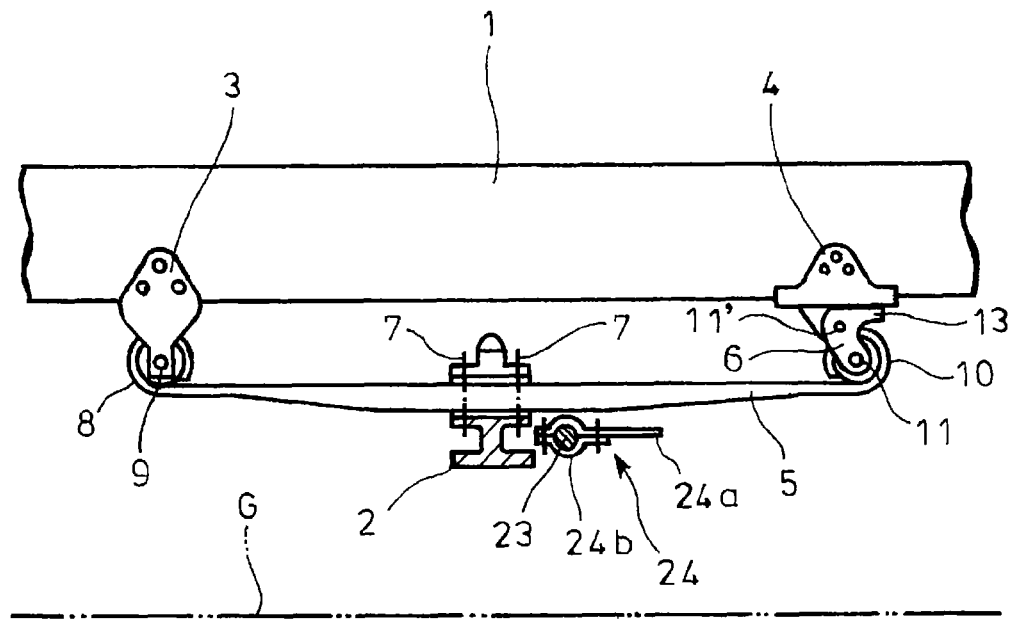
FIG. 8 is a side view showing a third embodiment of the suspension device according to the invention.
Figure 9:
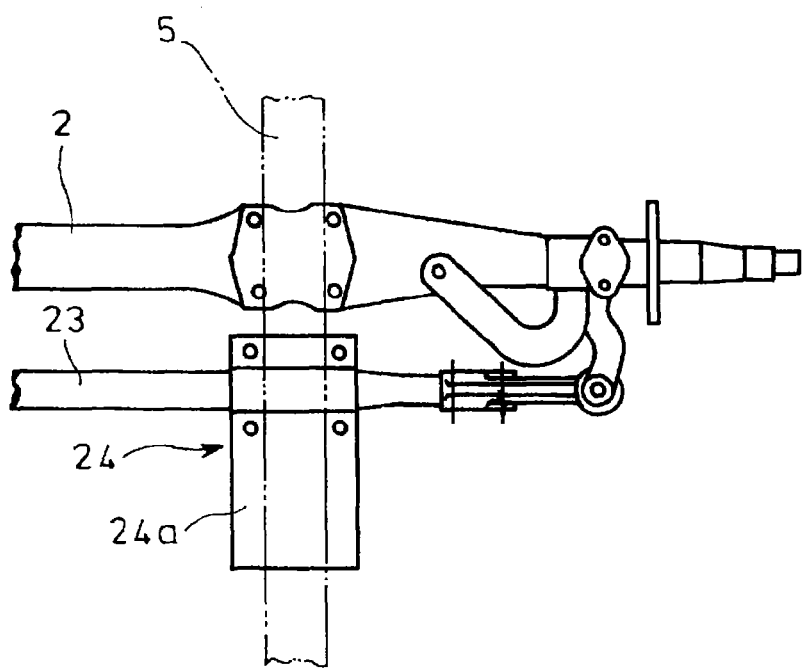
FIG. 9 a plan view showing a stopper plate of FIG. 8.

FIGS. 8-11 show a third embodiment of the suspension device according to the invention. As shown in FIGS. 8 and 9, this embodiment is specifically directed to an axle 2 for the front wheels, and in place of the stopper plate 12 as the second restriction means in the previous first embodiment, a stopper plate 24 (stopper) protruding backward for a predetermined length is fitted over a tie rod 23 arranged just behind the axle 2, so that the rear portion of the leaf spring 5 is supported from below by the stopper plate 24 upon the breakage.

Furthermore, as the second restriction means for restricting the shackle 6 from pivotally moving backward beyond a predetermined angle, a retainer pawl 13 protruding backward by a predetermined length extends from an upper end of the shackle 6, so that when the broken rear portion of the leaf spring 5 is supported from below by the stopper plate 24, the retainer pawl 13 restricts the rear portion of the leaf spring 5 from moving backward so as not to cause the rear portion of the leaf spring 5 to move backward and drop from on the stopper plate 24 onto the ground.

Figure 10:
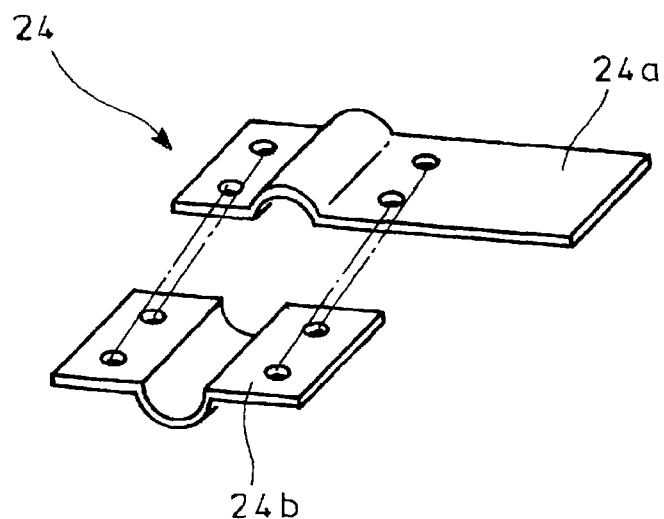
FIG. 10 is an exploded view of the stopper plate in FIG. 8.

The stopper plate 24 comprises, as shown in FIG. 10, a stopper plate body 24a and a base plate 24b. The tie rod 23 is clamped between a base end of the stopper plate body 24a and the base plate 24b which are connected together with bolts and nuts.

Figure 11:
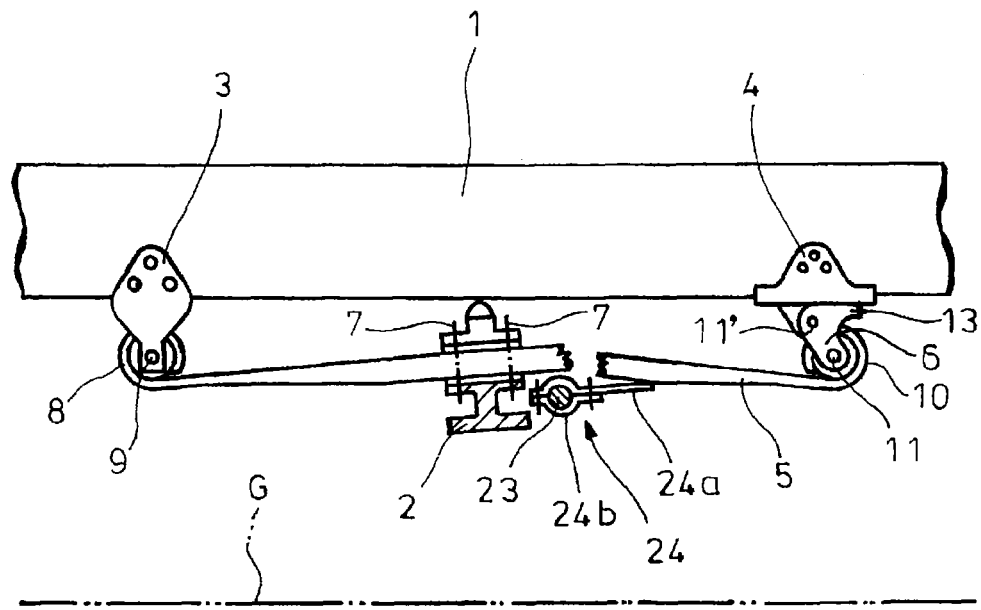
FIG. 11 is a side view showing a leaf spring in FIG. 8 upon breakage.

With the suspension device thus constructed, as shown in FIG. 11, upon the breakage of the leaf spring 5 at a position behind the intermediate portion of the spring, the engagement of the retainer pawl 13 with the step 4a of the rear bracket 4 restricts the shackle 6 from pivotally moving backward beyond the predetermined angle to restrict the rear portion of the leaf spring 5 from moving backward while the rear portion of the leaf spring 5 is supported from below by the stopper plate 24 to restrict the leaf spring 5 from pivotally moving downward beyond the predetermined angle, so that there is no fear that the broken rear portion of the leaf spring 5 contacts the ground G.

Thus, also in such third embodiment, upon the breakage of the leaf spring 5 at the position behind the intermediate portion of the spring, the leaf spring 5 can be restricted from pivotally moving downwardly beyond the predetermined angle to preliminarily prevent the rear portion of the leaf spring 5 form tilting downward into contact with the ground G, so that lift-up of the vehicle body in pole-vault manner using the rear portion of the leaf spring 5 as support is surely averted to substantially improve the safety.

It is to be understood that a suspension device according to the invention is not limited to the above embodiments and that various changes and modifications may be made without departing from the scope of the invention.

REFERENCE SIGNS LIST 1 side rail
2 axle
3 front bracket
4 rear bracket
5 leaf spring
6 shackle
12 stopper plate (stopper: first restriction means)
13 retainer pawl (second restriction means)
14 rubber
15 rubber
16 rubber
17 rubber
18 bush (first restriction means)
23 tie rod
24 stopper plate (stopper: first restriction means)
G ground

The invention claimed is:

1. A suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, the suspension device comprising:
- first restriction means for restricting a rear portion of said leaf spring from tilting downward relative to said shackle upon breakage of said leaf spring at a position behind the intermediate portion of the spring and
- second restriction means for restricting said shackle from pivotally moving backward beyond a predetermined angle,
- wherein said first restriction means comprises a bush arranged at a connection between said shackle and the rear end of said leaf spring to allow rotation of the rear end of said leaf spring using shearing strain of rubber, said bush being assembled with a reactive force being preliminarily afforded for upward tipping-up of the rear portion of said leaf spring upon the breakage.

2. The suspension device of claim 1, wherein the second restriction means includes a retainer pawl that extends from a top of the shackle.

3. A suspension device in which front and rear brackets are arranged on a side rail ahead of and behind an axle, respectively, a single leaf spring being pivoted at a front end thereof to the front bracket and being pivoted at a rear end thereof to the rear bracket through a shackle pivotally movable backward and forward, said axle being suspended by an intermediate portion of said leaf spring, the suspension device comprising:
- first restriction means for restricting a rear portion of said leaf spring from tilting downward relative to said shackle upon breakage of said leaf spring at a position behind the intermediate portion of the spring; and
- second restriction means for restricting said shackle from pivotally moving backward beyond a predetermined angle,
- wherein said first restriction means comprises a stopper for supporting the rear portion of said leaf spring from below upon the breakage, said stopper being provided on a tie rod which in turn is arranged just behind said axle.

4. The suspension device of claim 3, wherein the second restriction means includes a retainer pawl that extends from a top of the shackle.

* * * * *